United States Patent [19]
Roberts et al.

[11] 3,765,090
[45] Oct. 16, 1973

[54] METHOD AND APPARATUS FOR MAKING CHEESE

[75] Inventors: Miron J. Roberts, Glenview; Heinz F. Runge, Niles, both of Ill.

[73] Assignee: Kraftco Corporation, New York, N.Y.

[22] Filed: Feb. 11, 1971

[21] Appl. No.: 114,647

Related U.S. Application Data

[63] Continuation-in-part of Ser. No. 768,391, Oct. 17, 1968, Pat. No. 3,562,910.

[52] U.S. Cl. ............................................. 426/38
[51] Int. Cl. ............................................. A01j 25/15
[58] Field of Search .................... 31/46, 89, 44, 35

[56] References Cited
UNITED STATES PATENTS

| | | | |
|---|---|---|---|
| 3,401,041 | 9/1968 | Nelson | 31/46 X |
| 2,039,162 | 4/1936 | Gerstenberg | 31/35 |
| 3,133,492 | 5/1964 | Czulak et al. | 31/44 X |
| 2,982,661 | 5/1961 | Thompson | 31/44 X |
| 3,562,910 | 2/1971 | Runge et al. | 31/89 |

Primary Examiner—Hugh R. Chamblee
Attorney—Anderson, Luedeka, Fitch, Even & Tabin

[57] ABSTRACT

A method and apparatus for the manufacture of close-knit natural ripened cheese from curd which is in particulate form. A cheese-producing medium is made into curd in accordance with conventional procedures for the particular type of cheese to be produced. Since later treatment steps do not permit or result in moisture separation, the curd preparation procedure is adjusted to provide curd at a desired and legal moisture level for the cheese which is to be produced. The particulate curd is then transferred to apparatus wherein the curd is transferred and formed into a curd mass without damage to the curd particles. The curd is subjected to vacuum deaeration during the transfer. Thereafter, the curd mass is subjected to a second vacuum deaeration step. The curd mass is then cured to provide natural ripened cheese and the cheese is cut into suitable sized pieces and wrapped or otherwise packaged. As an optional feature, the curd may be subjected to tension loading during the curing step to provide a more closely knit texture.

7 Claims, 15 Drawing Figures

Patented Oct. 16, 1973

INVENTORS
MIRON J. ROBERTS
HEINZ F. RUNGE

*Anderson, Luedeka, Fitch, Even, & Tabin*
ATTYS.

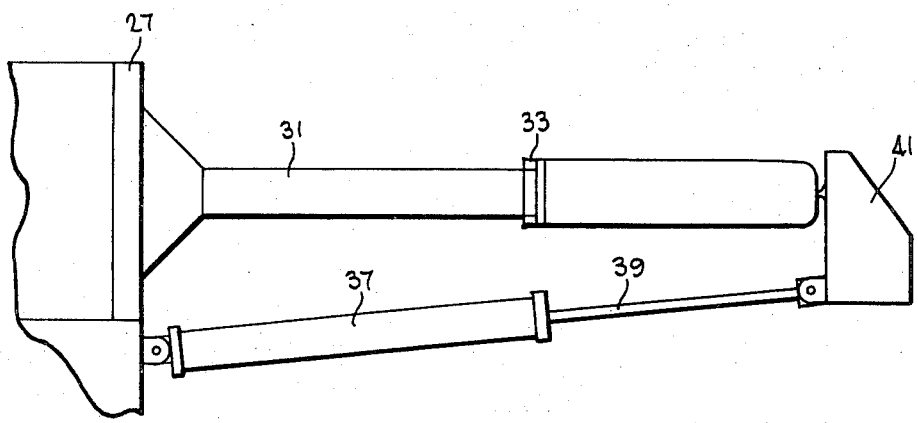
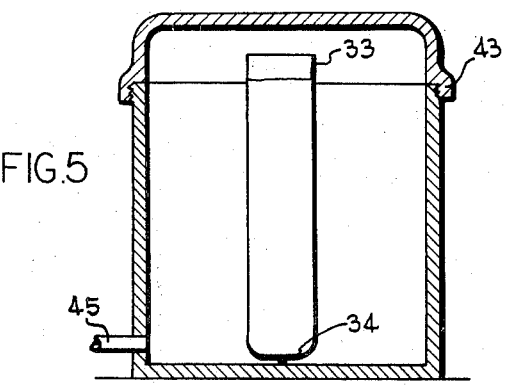
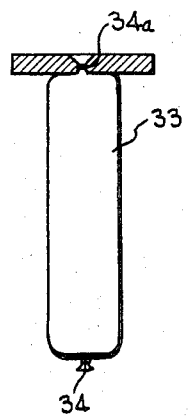
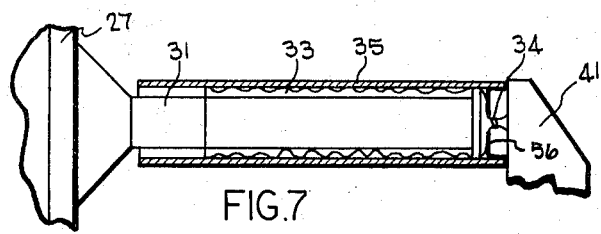
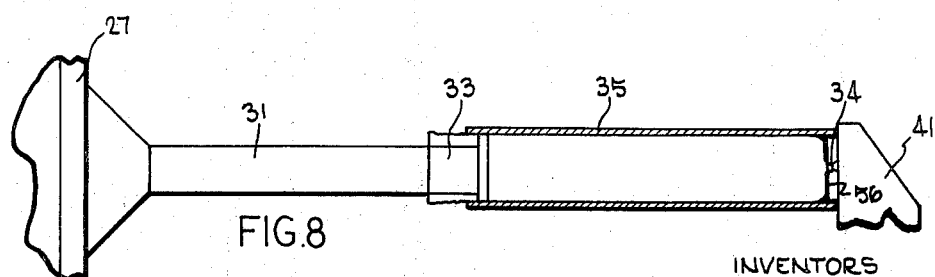

Patented Oct. 16, 1973
3,765,090
4 Sheets-Sheet 3
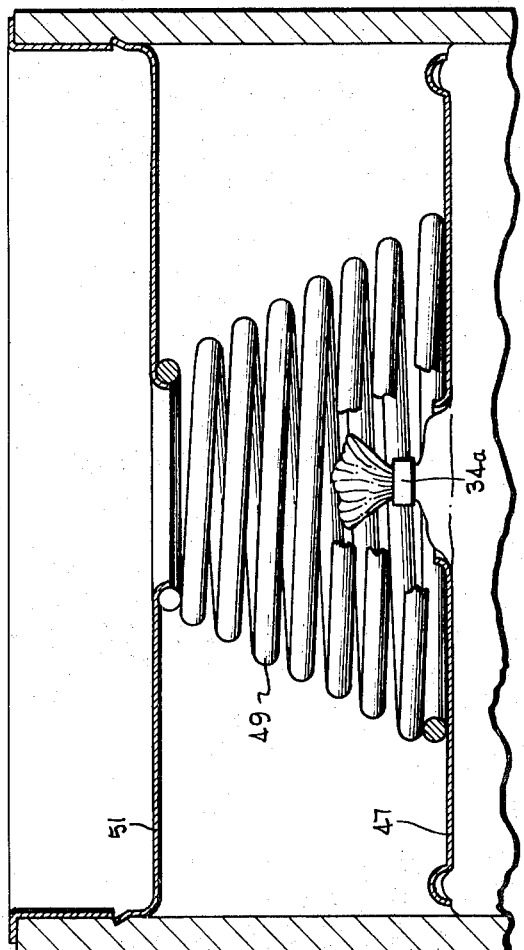
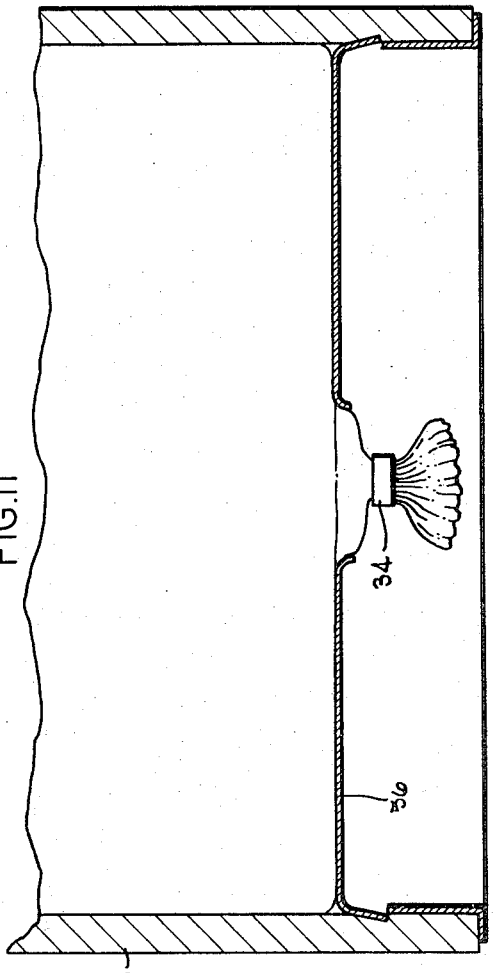
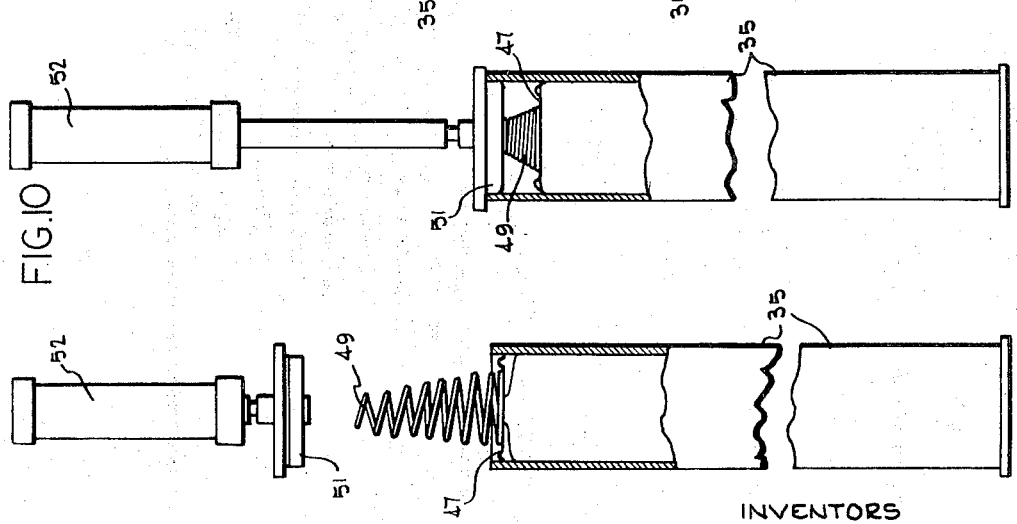
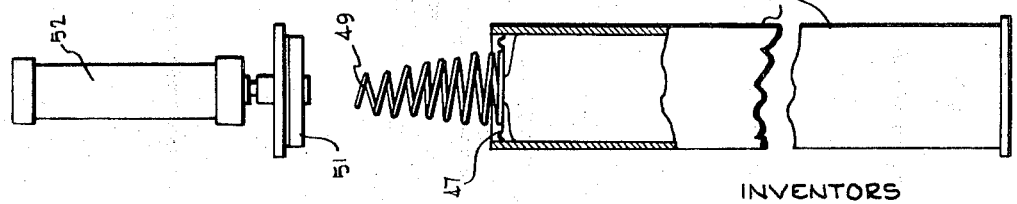
INVENTORS
MIRON J. ROBERTS
HEINZ F. RUNGE
Anderson, Luedeka, Fitch, Even & Tabin
ATTYS.

Patented Oct. 16, 1973

INVENTORS
MIRON J. ROBERTS
HEINZ F. RUNGE

Anderson, Luedeka, Fitch, Even & Tabin
ATTYS.

METHOD AND APPARATUS FOR MAKING CHEESE

The present invention is a continuation-in-part of co-pending application Ser. No. 768,391, filed Oct. 17, 1968, which has now issued as U.S. Pat. No. 3,562,910.

The present invention relates generally to the manufacture of natural cheese, and more particularly, it relates to a method for the continuous manufacture of natural cheese having a close texture from particulate cheese curd.

Cheeses may be classified or characterized as natural or processed. Natural cheese may be considered as any cheese made directly from a naturally occurring media, such as cow's milk or sheep's milk. Processed cheese may be made by comminuting natural cheese and then heating it with other materials to provide a product.

Natural cheese may be "ripened" or "unripened". For the purpose of the present invention, "ripened" cheese refers to any natural cheese which is cured during storage by either internal or external organisms. Examples of ripened cheese are Cheddar cheese and brick cheese. "Unripened" cheese refers to any natural cheese which is made and used without undergoing ripening, as for example, cottage cheese or cream cheese.

Natural, ripened cheese may be further characterized by the relative closeness of the texture and appearance of the cheese. In the manufacture of certain cheeses, such as Cheddar, it is desirable that the cheese be of close texture, i.e., be smooth and continuous without noticeable void or open spaces. Other cheeses, such as Colby, have a texture and appearance that is more open, i.e., with some void or open spaces.

The present invention is directed to an improved process for preparing ripened natural cheese including, but not limited to, the following varieties of cheese: Cheddar, Colby, brick, Gouda, Swiss, Edam, Monterey and Jack cheese. The method of the invention is particularly suitable for the production of cheese with a close texture and appearance.

In general, most natural cheesemaking operations include the steps of providing a cheesemaking medium, inoculating the medium with an acid-producing microorganism, and forming a coagulum. The coagulum is cut to provide curd and whey, whereupon the curd is separated from the whey and subsequently the whey is drained from the curd. The curd is then salted. The curd is pressed and then packed into a suitable form and, upon ripening, becomes a natural cheese. Variations in one or more of the above steps for producing cheese result in production of many varieties of natural cheese which are known.

The present invention is particularly directed to a system, apparatus and method for improvement in the method of handling particulate curd after whey has been separated therefrom, so as to provide the curd in a particular condition for subsequent curing. The curd mass is thereafter cured in accordance with known procedure for the particular type of cheese to be produced. The present invention is an improvement of the method for handling particulate curd disclosed in a copending application to Heinz F. Runge and Miron J. Roberts, filed Oct. 17, 1968, now U.S. Pat. No. 3,562,910. The present invention is directed to providing an improved method for handling cheese curd which is to be made into natural ripened cheese so as to provide the cheese with a more close-knit texture and appearance. The method and apparatus of the invention are adapted to continuous manufacture of cheese.

Accordingly, it is an object of the present invention to provide an improved method and apparatus for the manufacture of natural ripened cheese with a close knit texture and appearance. It is another object of the present invention to provide an improved method and apparatus for handling cheese curd which is to be made into close-knit, natural ripened cheese without destroying curd identity prior to curing. It is a still further object of the present invention to provide an improved method and apparatus for providing particulate curd in the form of cheese mass which may be cured to provide a close-knit, natural ripened cheese.

These and other objects of the invention will become more clear from the following detailed disclosure and from the accompanying drawings, wherein:

FIGS. 2-4 are schematic views of apparatus showing various positions of the apparatus and various features of the invention for transferring and forming curd in a container;

FIG. 5 is a schematic view of vacuum deaeration apparatus showing various features of the invention;

FIG. 6 is a schematic view of a further step and apparatus showing a method for closing the curd container;

FIGS. 7-10 are partial schematic views of apparatus similar to FIGS. 2-6 showing the use of a container sleeve;

FIGS. 11-12 are enlarged cross-sectional views of the top and bottom portions of the container sleeve of FIG. 10;

Figure 1:
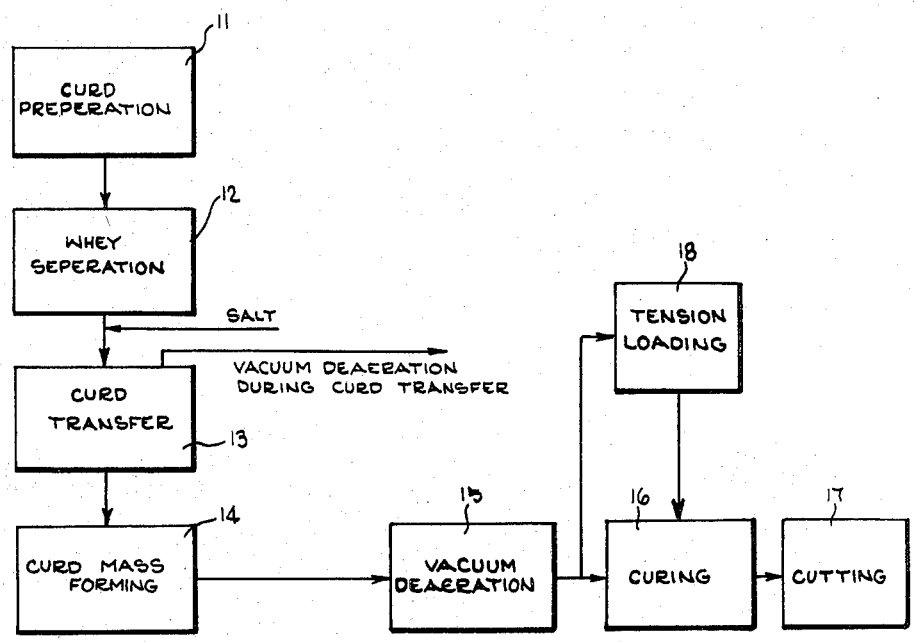
FIG. 1 is a flow diagram of a process showing 20 various steps of the invention.

Generally, as shown in FIG. 1, the method of the invention relates to the manufacture of close-knit, natural ripened cheese from curd which is in particulate form. A cheese-producing medium, such as cow's milk, is used for purposes of description of the process. In the curd preparation step, designated by numeral 11, the medium is treated in accordance with conventional procedures for the particular type of cheese to be produced so as to provide curd and whey. In making the curd, the cheesemaker uses conditions to achieve the desired moisture level in the curd after whey is removed. The next step is whey separation, shown at numeral 12, wherein the whey is separated from the curd, providing a moisture in the curd which is that desired in the finished cheese. Since later treatment steps do not permit or result in moisture separation, the curd preparation or "make" procedure must be adjusted to provide curd at a desired and legal moisture level for the cheese which is to be produced. If salt is required for the cheese, the salt is then added at the level desired in the finished cheese and is stirred into the particulate curd. The salt may be added dry, or may be added as a brine, depending upon the type of cheese to be produced.

The particulate curd is then transferred by apparatus of the invention as indicated at numeral 13. The curd is subjected to a first vacuum deaeration during the transfer of the curd. The particulate curd is formed into a curd mass, as indicated by numeral 14, without damage to the curd particles. The mass is next subjected to further vacuum deaeration, designated at numeral 15.

In the curing step, designated numeral 16, the cheese mass is cured in accordance with conventional procedures for the type of cheese being produced, so as to cure the cheese and develop the desired flavor in the cheese. The cheese is then cut into suitable-sized pieces and wrapped or otherwise packaged in a cutting step, designated by numeral 17. As shown in FIG. 1, the curd mass which has been treated by vacuum deaeration may be subjected to a further optional step prior to curing, which further step is described as tension loading, which is designated by numeral 18. Tension packing will be described in more detail hereinbelow.

To more particularly describe the method of the invention, it may be adapted to the manufacture of cheese from any suitable medium which provides curd. The method may be used for treating curd prepared from cow's milk, sheep's milk, goat's milk, soy milk, filled milk and imitation milk. Detai's fo setting the cheese producing medium to provide a coagulum, cutting the coagulum to provide curd and whey, stirring the curd and whey, cooking the curd, draining the whey from the curd, forming the curd into a curd mass and curing the curd mass to provide natural, ripened cheese may be varied to produce characteristics and qualities distinctive to the particular kind of cheese to be produced. As earlier pointed out, the cheesemaker will make variations in make procedure to provide the desired or necessary moisture in the finished product.

Figure 2:
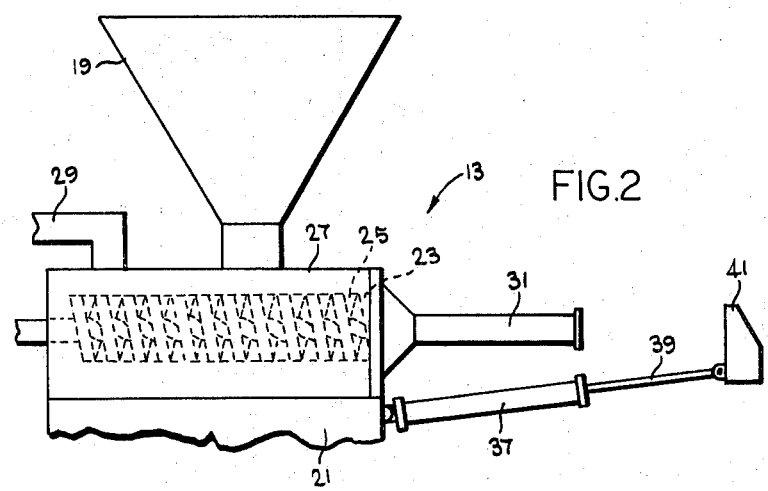

As shown in FIG. 2, apparatus of the invention for transferring the particulate curd and forming the curd into a curd mass includes a hopper 19 for receiving the particulate cheese curd. The hopper 19 feeds a curd transfer device 21 adjacent thereto. The curd transfer device 21 includes a pair of co-acting helical cams 23 and 25 and a close-fitting housing 27 therefor. The housing 27 is provided with an opening 29 through which vacuum may be established within the housing. The curd transfer device is of particular importance to the present invention, and functions to transfer the curd without damage to the curd particles. The device does not plow through the curd, and the edges of the cams 23 and 25, in their operation, do not cut the particles as normally occurs with a screw conveyor. The curd transfer device 21 functions to carry the curd as distinguished from putting the curd under positive pressure and thereby minimizes damage to the curd. Any pressure developed in the curd transfer device is by way of back pressure at the outlet end and not by means of the pair of helical cams. The distinction between the function and operation of the helical cams and the operational characteristics of a screw conveyor are to be particularly noted in connection with the invention.

Figure 3:
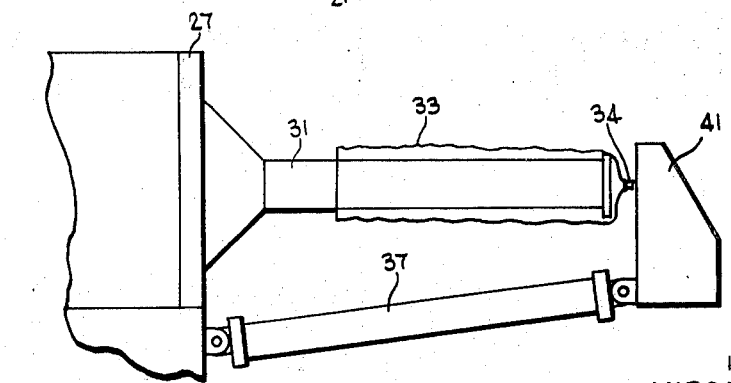

As shown in FIGS. 2, 3 and 4, a curd forming tube 31 is provided at the outlet end of the curd transfer device 21. The forming tube functions to partially compress the particulate curd into a curd mass by frictional forces encountered within the forming tube and to direct the partially compressed curd mass to a container 33 which is placed over the outlet end of the forming tube 31. A restraining plate 41 is provided to establish a back pressure on the container 33 as it is being filled with curd. The restraining plate 41 is controlled by hydraulic cylinder 37 and piston 39. The container 33 is preferably a flexible bag and various features of the invention will hereafter be described with reference to the use of a flexible bag as the container. However, the use of rigid containers, such as cardboard or metal tubes, is also contemplated.

As previously indicated, the system may be used to produce various natural, ripened cheeses where a close-knit texture is desired. However, the method of the invention for preparing a close-knit, cohesive cheese mass from particulate cheese curd may best be understood by reference to the manufacture of a particular type of cheese. Accordingly, various of the features of the invention will hereinafter be described with particular reference to producing Cheddar cheese. However, it should be understood that the scope of the invention is broader than the description of the manufacture of this particular cheese.

Cheddar cheese may be made by the method of the present invention from raw, heat treated, but unpasteurized, or pasteurized milk. The milk may be provided from any suitable animal, such as cows, sheep or goats. The milk is brought to the setting temperature of about 88°F and is transferred to a cheese vat. A starter culture is added, and the milk is stirred for about 1 hour as the milk develops acidity. Rennet is then mixed in thoroughly and stirring is stopped. A coagulum is formed usually about 30 minutes after adding of the rennet and the coagulum is cut with curd knives to provide curd and whey. The curd is stirred continuously in the whey from the time of cutting until the whey is drained from the curd. About 15 minutes after the cutting is completed, the curd is gradually cooked by heating the curd over about 30 minutes to a temperature of about 100°F. The curd is held at the elevated temperature for about 60 minutes.

The whey is then drained from the curd and the curd is dry-stirred for a period of from about 30 minutes to about 60 minutes or until the desired moisture has been reached. The moisture should not be over 43.5 percent. The temperature of the curd is maintained at about 100°F during the dry stirring period by regulating water temperature in the jacket of the drain table. When the moisture is below 40 percent, salt is added to provide a desired level of salt in the finished cheese. The salt is added at a level sufficient to provide a salt content of about 1.7 percent in the finished cheese. The curd is stirred for an additional 10 minutes after all the salt is added. The moisture of the curd is then from between about 38 percent and 39 percent and has a pH of from about 5.3 to about 5.35. The curd is then transferred to the hopper 19 of the curd mass forming apparatus. The make procedure varies from the usual make procedure for Cheddar cheese in that the curd has the final moisture content of the cheese and no pressing or hooping of the curd is utilized. Furthermore, the subsequent processing, in accordance with the invention, does not apply sufficient pressure to the curd to cause it to exude moisture. The provision of a dry curd having the desired level of moisture in the finished cheese can be provided within the skill of the art for various types of cheese by adjusting various of the cheesemaking steps to provide such curd.

As indicated, the curd, in the form of small pieces, is then transferred to the hopper 19. The curd drops from the bottom of the hopper 19 into pockets which are formed by the cams 23 and 25, and the housing 27, as will be explained in further detail hereinafter. Curd is transferred from the outlet of the hopper 19 in the curd transfer device 21 to the inlet of the curd forming tube 31 by means of the cams. The curd is partially deaerated by vacuum during its passage from the hopper to the forming tube in the curd transfer device. Such deaeration is advantageous to obtain proper cure feeding and transfer. As the particulate curd is forced into the forming tube 31, resistance is established by friction between the curd and the walls of the tube. The resistance acts to partially compress the curd within the tube and to aid in forming the curd into a cohesive cheese mass. As the partially compressed curd exits from forming tube 31, it begins to fill the container 33.

As indicated, the container 33 is preferably a flexible plastic tube which is sealed at one end by means of a wire clip 34 or other suitable closure device. A constant back pressure is maintained on the container 33 by means of the restraining plate 41, which is controlled by the hydraulic cylinder 37 and the piston 39. The back pressure is controlled so as to provide even loading of the container 33 under a constant back pressure. It is generally desirable to maintained a back pressure of from about 5 psi to about 50 psi on the container 33 as it is being filled.

As shown in FIG. 5, after the container 33 is filled with cheese curd, the container is removed to a vacuum chamber 43. The top of the container is kept open when the container is placed within the vacuum chamber. A vacuum is then established within the vacuum chamber 43 through a conduit 45 which is connected to a vacuum pump (not shown).

It is generally desirable that vacuum deaeration of the curd within the container 33 be accomplished as soon after the curd is loaded into the container as possible. To accomplish satisfactory deaeration of the curd so as to establish a close-knit texture, the curd should be at a temperature of between about 70°F and 100°F during the vacuum deaeration step. It is preferred that the curd temperature be within the range of from about 75°F to about 95°F during the vacuum deaeration step. The longer the curd is permitted to remain in the container 33 the more the curd is cooled and the less effective the vacuum deaeration becomes. In general, vacuum deaeration should be accomplished within a period of no more than about two hours from the time that the container 33 is loaded with curd, unless the curd is maintained in a heated room having a temperature within the desired range. However, vacuum deaeration is less effective regardless of the temperature of the curd, if the vacuum deaeration is accomplished more than about three hours from the time that the container is loaded with curd. The effectiveness of vacuum deaeration to provide a close-knit texture is diminished if the curd is permitted to cool below the above indicated range and is then subsequently warmed to a temperature within the range. However, some improvement in texture and closeness of knit is attained when vacuum deaeration is performed at a subsequent time so long as the curd is warmed to a temperature within the indicated range prior to effecting vacuum deaeration. In general, a vacuum of from about 20 inches of mercury to about 29 inches of mercury for a period of about 30 minutes to about 120 minutes is sufficient to provide suitable vacuum deaeration in accordance with the invention. Higher and lower vacuum conditions may be used with a corresponding adjustment in the time required to accomplish vacuum deaeration.

After the curd within container 33 is subjected to vacuum deaeration, the curd is stored for a sufficient period of time at a suitable temperature to effect curing of the curd. In this connection, curing is usually effected for a period of at least about one month at a temperature of from about 40°F to about 50°F. The resulting cured Cheddar cheese product has an acceptable, close-knit texture and appearance.

In accordance with known cheese make procedures, the curd must be protected from exposure to oxygen from the air or other source during the curing period. In this connection, the curing may be effected in an inert atmosphere which is established in the curing room. A preferred method for protecting the curd is to close the container 33 in which the curd has been packed. When a flexible receiving bag is used as the container, the top of the bag may be closed with a wire clip 34a or other closing device, as shown in FIG. 6.

If a still more closely-knit texture and appearance is desired in the finished cheese product, the cheese may be packed and stored under compressive tension. To effect compressive tension, a container 33, such as a flexible receiving bag, is placed into a sleeve 35. The particulate cheese curd may be first extruded into the bag and the bag inserted into the sleeve 35. A preferred method for placing the bag into the sleeve 35 is to place the sleeve 35 over the bag while the bag is over the forming tube 31, as shown in FIG. 7. Thereafter, as the particulate cheese curd is forced from the forming tube 31 into the bag, the bag expands to fill the space within the sleeve 35. This provides a cheese mass with a uniform cross-section within the sleeve 35. As shown in FIG. 11, the sleeve 35 has an end seal 36, with an orifice located therein for accepting the closed end of the bag.

After a cheese mass is formed within the bag and the bag is placed within the sleeve 35, the cheese mass is subjected to vacuum deaeration in vacuum chamber 43 under the conditions previously described. After vacuum deaeration, the open end of the bag is sealed with a suitable sealing means, such as the wire clip 34a. Thereafter, a spring seating disk 47 is placed over the end of the bag as shown in FIG. 9. A spring 49 is placed into contact with the spring seating disk 47, and an end seal 51 is forced onto the spring 49 so as to compress the spring within the sleeve 35. The end seal 51 locks into place in the end of sleeve 35 and holds spring 49 in tension. Spring 49 exerts a compressive force on spring seating disk 47, which in turn exerts a compressive force on the curd mass in the bag. The spring 49 is selected to exert a force sufficient to establish a pressure on the curd mass of from about 0.25 to about 5 psi. Higher pressures may be used but no appreciable improvement in texture and knit is obtained. The end seal 51 is urged into place in sleeve 35 by means of hydraulic cylinder 52 and piston 53.

After placing end seal 51, spring 49 and spring seating disk 47 in place in sleeve 35, the sleeve 35 is then stored under suitable conditions for curing the cheese mass. At the end of the curing period, a close-knit cheese product is obtained with almost no void space. The product is judged to be of superior quality with respect to texture and appearance.

Figure 13:
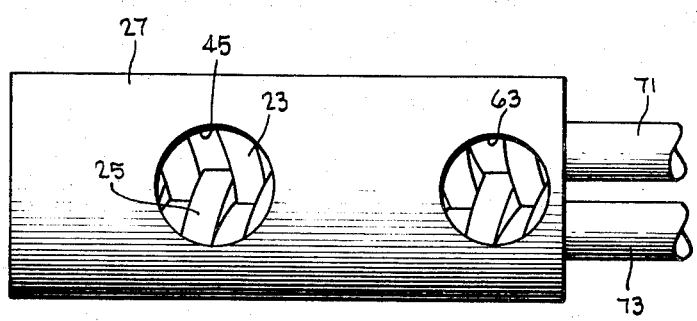
FIG. 13 is an enlarged top elevation view of a portion of the transfer apparatus of the invention.
Figure 14:
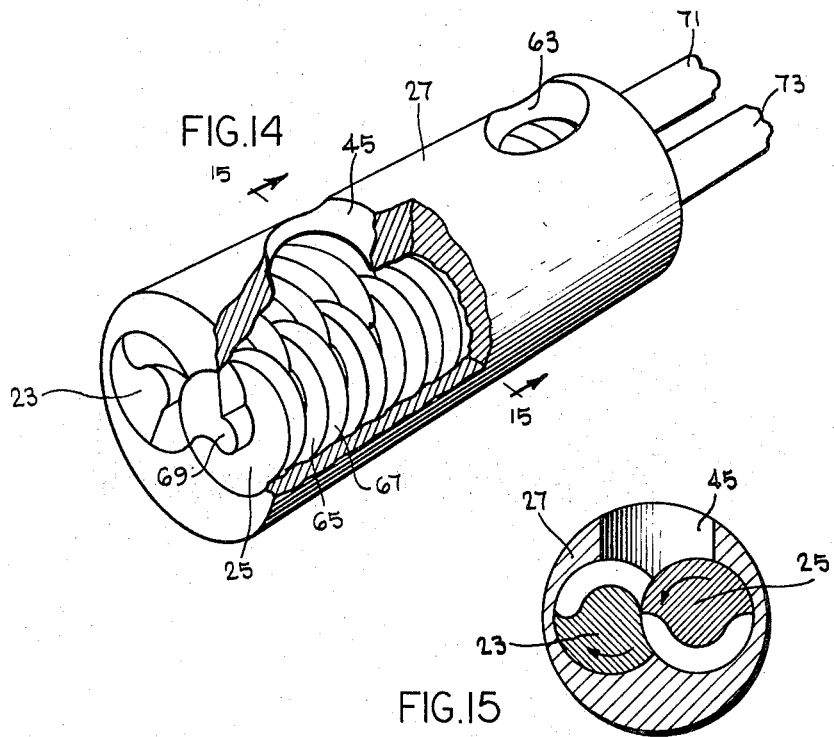
FIG. 14 is a perspective view, partially broken away, of the apparatus of FIG. 13.
Figure 15:
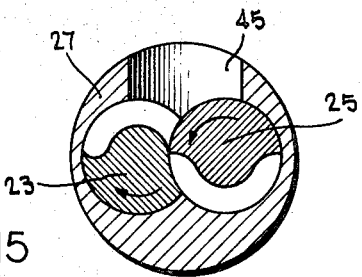
FIG. 15 is a sectional view taken along the lines 15, 15 of FIG. 14.

The curd transfer device 21 for moving the curd particles from the hopper 19 to forming tube 31 is best seen in FIGS. 13, 14 and 15. The device comprises cams 23 and 25 and housing 27. A feeding port 45 is located in the housing for receiving the curd from the hopper 19 and providing the curd to the cam. A further opening 63 is located in the housing. The opening 63 is used to communicate with a vacuum source and thereby establish vacuum within the housing whereby the curd is partially deaerated during transfer. The pair of cams 23 and 25 have spiral grooves 65 and lands 67, each of which is generally rectangular in cross-section. Lands and grooves of each cam, as shown in the drawings, are generally square-cut, and are machined to mate with the corresponding lands and grooves of the other cam. In operation, the interlocking nature of the pair of cams works in effect to establish a series of continuously forwardly moving pockets which accept cheese curd from the hopper 19 and deliver the curd to the entrance of the forming tube 31. The curd is not pushed or particularly squeezed in its movement through the curd transfer device. The pocket walls are bounded by the sides of two successive lands 67. The bottom of the pocket is established by the bottom of the cam shaft 69 and the top of the pocket is established by the housing 27. The pocket is also bounded by the face of the lands of the other cam.

Cams 23 and 25 are driven by motor means (not shown) which is connected to the shafts 71 and 73. As the cams are turned in the direction indicated in FIG. 15, each pocket is continuously defined by different portions of the lands and grooves of cams 23 and 25 and housing 27. The appearance from the feed port 45 is of a series of continuously moving pockets, and the curd particles move in the pocket, but are not caught between the grooves and lands of the respective cams.

Curd is deposited in a pocket as it moves beneath the feeding port 61 located beneath the hopper 19. The pocket is generally C-shaped and may not be packed full of curd. As the pocket moves forward from beneath the feeding port 61, the curd within the pocket is isolated from the curd within other pockets and is not crushed, mashed or broken. Curd identity is retained until forming of the curd into a cheese mass is effected in the forming tube 31. This handling of curd by the curd transfer device 21 is to be distinguished from prior art single screw auger feeding systems. With a single screw auger, the flights of the auger cut through the curd and move the curd by pressure. Such action compresses and cuts the curd, destroying curd identity. A single or double screw auger has not been found suitable for the practice of the present invention.

As previously indicated, the curd is partially deaerated before being compressed within the forming tube 31 to form a cheese mass, and is again vacuum deaerated after being formed into a cheese mass within the container 33. Deaeration is considered an important step in the method of the invention. Deaeration in the method of the invention facilitates feeding of the curd to the curd transfer device, serves to remove air from between the curd particles before the curd particles are placed into container 33, and further compresses the curd particles within the container 33 to provide a closely-knit texture. As shown in FIG. 2, deaeration within the curd transfer device 21 is effected by connecting the housing 27 to a vacuum source (not shown) by means of pipe 29 located rearwardly of the feed hopper 19. Thus, vacuum is established within the housing 27 during transfer of the curd within curd transfer device 21. This vacuum is particularly advantageous for achieving proper filling of the pockets with curd, although it also functions to partially deaerate the curd. Generally, a vacuum greater than about 15 inches of mercury is sufficient to effect deaeration of the curd. However, a vacuum of greater than about 20 inches of mercury and up to about 28 inches of mercury is sometimes required to achieve proper filling of the pockets. Deaeration of the curd after filling into flexible receiving bag 33 is achieved within vacuum chamber 43 as previously described.

The above-described embodiment of the invention is suitable for continuous curd handling, and a considerable saving is effected over prior art methods for making closely-knit cheese. Obviously, the invention is particularly applicable to the production of any cheese of round configuration; however, other configurations, such as oval or rectangular, can also be provided.

The various features of the invention which are believed to be new are set forth in the following claims.

What is claimed is:

1. A method for making natural type cheese comprising providing curd particles, establishing the moisture level of finished cheese in said curd particles, transferring units of said curd particles without establishing substantial pressure on said curd particles and with minimum damage to said curd particles, subjecting said curd particles to a first vacuum deaeration during said transfer, thereafter forming a curd mass by transferring said units of curd particles into a container while maintaining a back pressure on said container during said transfer, thereafter subjecting said container with said curd mass to a second vacuum deaeration so as to further deaerate said cheese mass and close the body thereof and curing said cheese in said container to provide a natural cheese with a closely knit structure and desirable body and texture.

2. A method in accordance with claim 1 wherein said back pressure is from about 5 to about 50 psi.

3. A method in accordance with claim 1 wherein said second vacuum deaeration is effected while the temperature of said curd mass is from about 70°F to 100°F.

4. A method in accordance with claim 1 wherein said second vacuum deaeration is effected within a period of less than about three hours after said curd particles are transferred into said container.

5. A method in accordance with claim 1 wherein said container is a flexible bag.

6. A method in accordance with claim 1 wherein said curd mass in said container is subjected to compressive tension during said curing.

7. A method in accordance with claim 6 wherein said compressive tension is such as to establish a pressure of from about 0.25 to about 5 psi on said curd mass during curing.

* * * * *